(12) United States Patent
Euler

(10) Patent No.: US 7,729,658 B2
(45) Date of Patent: Jun. 1, 2010

(54) METHOD AND DEVICES FOR UTILIZING DATA IN DATA FORMATS WHICH CANNOT BE DIRECTLY PROCESSED

(75) Inventor: Hans-Jürgen Euler, Heerbrugg (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 10/527,259

(22) PCT Filed: Aug. 16, 2003

(86) PCT No.: PCT/EP03/09082

§ 371 (c)(1),
(2), (4) Date: Nov. 21, 2005

(87) PCT Pub. No.: WO2004/029550

PCT Pub. Date: Apr. 8, 2004

(65) Prior Publication Data

US 2006/0171339 A1    Aug. 3, 2006

(30) Foreign Application Priority Data

Sep. 14, 2002  (EP) ................................ 02020705

(51) Int. Cl.
*H04B 7/24* (2006.01)
(52) U.S. Cl. ............. 455/39; 455/406; 455/414.4; 455/432.2
(58) Field of Classification Search ............ 455/39, 455/406, 414.4, 432.2
See application file for complete search history.

(56) References Cited

U.S. PATENT DOCUMENTS

| | | | | |
|---|---|---|---|---|
| 4,740,963 | A * | 4/1988 | Eckley | 370/522 |
| 6,189,078 | B1 * | 2/2001 | Bauman et al. | 711/156 |
| 6,332,070 | B1 * | 12/2001 | Bochmann et al. | 455/12.1 |
| 6,671,680 | B1 * | 12/2003 | Iwamoto et al. | 707/3 |
| 7,039,421 | B2 * | 5/2006 | Couronne et al. | 455/456.1 |
| 2003/0088537 | A1 * | 5/2003 | Ko | 707/1 |
| 2004/0203856 | A1 * | 10/2004 | Wigren et al. | 455/456.1 |
| 2006/0135186 | A1 * | 6/2006 | Hans et al. | 455/466 |

* cited by examiner

*Primary Examiner*—Nay A. Maung
*Assistant Examiner*—Tuan H Nguyen
(74) *Attorney, Agent, or Firm*—Oliff & Berridge, PLC

(57) ABSTRACT

Reference dictionaries and data dictionaries are used in order to analyze data in data formats, which cannot be directly processed and which are communicated between geodesic units. These dictionaries are transmitted preferably in conjunction with the transmission of the data and they index analyzable data fields in data formats. When a geodesic unit receives a data format that cannot be directly processed, data fields, which can be analyzed by the reference dictionary, can be found and data fields, which cannot be analyzed by a data dictionary, can be utilized.

16 Claims, 7 Drawing Sheets

| 0001 | 01 | 00 | 00 | 00 | 00 | 00 | 00 | 00 |
| 0002 | 01 | 02 | 01 | 00 | 00 | 00 | 00 | 00 |
| 0003 | 02 | 03 | 01 | 01 | 00 | 00 | 00 | 00 |
| 0004 | 01 | 03 | 00 | 00 | 00 | 00 | 00 | 00 |
| 0005 | 01 | 03 | 01 | 02 | 00 | 00 | 00 | 00 |
| ... | ... | ... | ... | ... | ... | ... | ... | ... |

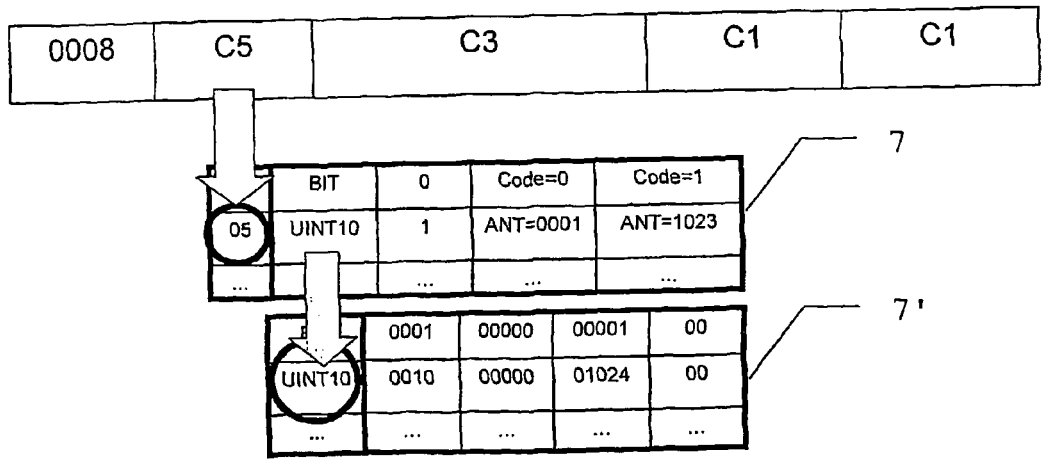

| 67 | 28 | 0 | 2400,000 | 0,002 |
| 68 | 29 | -12,000 | 1200,000 | 0,001 |
| ... | ... | ... | ... | ... |

METHOD AND DEVICES FOR UTILIZING DATA IN DATA FORMATS WHICH CANNOT BE DIRECTLY PROCESSED

BACKGROUND

The invention relates to a method for using usable data in data formats which cannot be directly processed, a geodetic device, a geodetic system, a computer program product, a computer data signal and a reference or data directory.

In many geodetic applications and systems, there is the necessity of frequent or continuous transmission of data between various devices. Predominantly transmitted data are those which have a time or space reference and may contain parameters of the measurement, measured values or general communication, such as, for example, error messages. Examples of such data are the current time, the location of a measuring device as well as any existing reference points, and direction, distance and angle relative to measuring points. The transmission may be effected by a large number of suitable wire-linked or wireless communication means, such as, for example, via a direct cable connection and directional or nondirectional radio data transmission.

Without restriction of the general usability of the method according to the invention and of the devices according to the invention, the application for a differential global navigation satellite system (D-GNSS), such as, for example, the global positioning system (GPS), is intended to serve here as an explanatory example. Data types and data formats which are described purely by way of example but can be used with a similar form in many further applications also relate thereto.

In differential GNSS, the position determination of a mobile unit, the so-called rover, is effected by data reception and data measurement relative to satellites as well as data reception of data measurements from at least one reference station. Since the position of the reference station is known and it likewise receives the identical signals of the satellites, some inaccuracies and errors can be eliminated by this differential correction method. By means of this method, a higher accuracy is possible than will be possible with a rover without a reference station. Such a station continuously transmits data from the received satellite signals to the rover. Depending on design, this may be raw data or already processed data.

In practice, however, reference stations are generally not installed newly for each measuring process but a procedure is effected which is based on an entire network of fixed reference stations which can also be used simultaneously by different users. In addition to the satellite-related data and the time, these stations also transmit specific information about themselves, such as, for example, their own reference station number. In addition, it is necessary to transmit technical data, such as, for example, antenna parameters, or correction parameters. Examples of such a correction parameter are atmospheric or geometric corrections which were determined, for example, in a network of permanent reference stations and associated network evaluation software and can now be used for correcting rover measurements as a function of the distance to the participating reference stations.

Since the utilization of the data of a reference station for various rovers should be possible, the transmission of the signals is nondirectional. However, this gives rise to the requirement that the communication also has to be possible with the various systems in the transmission range of a reference station, so that a form of standardization of transmitted data formats is necessary.

A standard for manufacturer-independent data formats which is used for such a transmission of data is specified by the Radio Technical Commission For Maritime Services (RTCM) in Alexandria, Va., USA. The term data format describes a complete information unit for transmission between geodetic devices. The information exchange takes place by means of identical or different data formats at identical or different data frequencies. The term data field describes a complete, defined data content having a specified value range. Data formats are composed, for example, of an initial identity code, different data fields and a final identity code with a possible checksum for data testing on receiving. The term data type describes the possible distinctness, such as, for example, length, without a sign or with a sign, of an information unit. Data types are used for describing data fields.

The standard RTCM V2.x applicable to date consists of one or more headers with data fields as basic information, to which additions can optionally be attached.

The occurrence of such additions in a data format is indicated by so-called flags as indicators. This means that each message transmitted has, after its introductory part, a sequence which indicates to the receiver whether and optionally which further additions follow. From this information, the recipient knows how he has to interpret and to process the data stream.

However, this solution of the prior art has the disadvantages that the number of possible permutations with the number of flags used is relatively small but nevertheless not every manufacturer has taken into account all possible permutations and the processing of the data associated therewith in his devices.

A solution known in the prior art for the limited number of flags consists in defining data formats, for example as selected permutations, and providing them with a continuous coding. From this number transmitted at the beginning of the communication, a device is able to derive the data format as a sequence of different data fields comprising data types and hence to evaluate the data fields.

SUMMARY

Although the address space and hence the number of usable communication variations compared with the flag alternative can be substantially extended in this manner, there is the problem that all variants to be transmitted have to be included beforehand in the firmware of the devices. If a device receives a communication or a data format having unknown coding, direct processing can no longer take place although data fields which can be evaluated in principle by this device too and have usable and processible data are optionally contained in the sequence of data fields.

In the case of a change of the available communications by addition of new data formats or a change of existing data formats, such a solution inevitably requires the creation of a new firmware variant by all manufacturers. In addition, after its creation, this new variant must be recorded on all devices, which results in a considerable coordination effort.

This problem described by way of example for differential GNSS can in principle also occur in communication between other geodetic devices. For example, a theodolite can exchange data with a further theodolite and/or intelligent reflector systems, a similar problem occurring since here too devices of different manufacturers and different stages of development have to communicate and cooperate.

The object of the present invention consists in the provision of a method and associated devices which permits a continuous change in a set of data formats.

In particular, it is intended to ensure that continuous adaptation of the firmware present on the geodetic devices due to revision of the standard or formulation of a new standard is dispensed with.

A further object consists in automated implementation of the processibility of data formats which cannot be directly processed.

A further object consists in enabling processibility of older data formats too.

A further object consists in permitting an extension of the usable data fields or data formats by introducing new data types.

The present invention relates to a method, geodetic devices, a geodetic system and a computer program product, a computer data signal and a reference or a data directory.

The communications to be transmitted according to the invention are sent in a data format which consists of a sequence of at least two data fields. A data field has basically any length, so that the data fields within a data format can have a different length. The information in each data field is stored in a defined data type. Within a data format, data fields may be repeated, for example if data of the same type from a plurality of satellites are transmitted in succession, or the same information can be stored in a plurality of data fields of a different data type, for example in the transmission of the time in different presentation forms. Furthermore, a communication may contain a plurality of indicators, such as, for example, flags or parity bits. These are likewise subsumed in each case under the definition of the data field.

The data format of each communication can be uniquely determined on the basis of a coding which is preferably numerical or alphanumerical. In each geodetic device according to the invention which is designed for receiving the communications, means for processing usable data which can evaluate a set of data fields known to this device are present. In addition, the device has knowledge of a certain number of data formats, i.e. both the data fields contained and the sequence thereof are known to the device and can be used as a basis for the processing, for example owing to the coding of a communication. These data formats thus constitute a set of directly processible data formats which have exclusively data fields which can be evaluated. The term "can be evaluated" relates here to the fact that detection and evaluation of the data stored in this data field can be performed by the device or the firmware present thereon. This does not mean that it is necessary for the respective data subsequently actually to be processed for a certain purpose. The term "can be evaluated" thus relates to the potential utilizability of the data in the respective data field.

The term "geodetic device" is intended in this context generally always to mean devices which serve or are set up for the measurement or testing of data with spatial reference. In particular, this relates to the measurement of location, distance and/or direction or angles relative to one or more reference or measuring points. This does not relate exclusively to terrestrial systems but also to those which use components for satellite-assisted position determination (for example GPS or GLONASS). In particular, geodetic devices are to be understood here as meaning, for example, stationary, mobile reference stations or moving stations, so-called rovers, but also smaller, mobile devices, such as theodolites, and so-called total stations as tacheometers with electronic angle measurement and electro-optical telemeter. At the same time, the invention is suitable for use in specialized devices having a similar functionality, for example in military aiming circles or in the monitoring of industrial structures or processes; these systems are hereby likewise included under the term "geodetic device".

If the existing data formats are supplemented by the addition of new data formats, these new data formats cannot be processed directly since a knowledge of the structure is not available to the device. Adaptation and addition of data fields may be necessary, for example, for increased resolution or a changed value range. Since optimum data throughput and optimum communication must also be taken into account, replacement of the existing data formats by newly defined data formats is advantageous. The new data formats may consist of a permutation of the data fields of a known data format and may be a new sequence of data fields. These data formats optionally also contain new types of data fields which can be neither recognized nor used by the device. These data fields therefore cannot be evaluated.

The new data formats which cannot be directly processed therefore consist of a sequence of data fields which can be evaluated and/or which cannot be evaluated.

In order nevertheless to permit utilization of the data formats which cannot be directly processed, the device must be able to identify or localize the data fields which can be evaluated. According to the invention, a reference directory is therefore transmitted preferably in association with the establishment of a communication link between the participating devices in the case of a bidirectional communication, whereas, for unidirectional connections, parts of the reference directory can also be transmitted for distribution over a certain period and with repetitions by means of data formats to be defined. Further reasons for the automated or manually initiated transmission of the reference directory may however also be external processes, such as, for example, the logging on of a receiving device which cannot process a communication, or internal processes in the sending device, such as, for example, the elapse of a counter or the reaching of a time mark, with the result that in particular a periodic transmission of the directory can be effected.

The reference directory contains, for each coded data format, the sequence and the types of data formats used. One or more data fields which can be evaluated can therefore also be used within a completely new data format which cannot be directly processed. Indirect processibility of the new data formats is thus permitted.

Alternatively, instead of the direct specification of the sequence of data fields, it is also possible to use a different notation. For example, new data formats which cannot be directly processed can also be derived from the known data formats by specifying the changes. Particularly in the case of new data formats which can be represented merely as the arrangement in series of shorter, known data formats, this notation is possible since the reference directory can be kept smaller thereby. The specification of the change is advantageous even when a large stock of comparatively short data formats which can describe more complex data formats in a more or less modular fashion is already present. To this extent, these short data formats represent meta data fields for superior, longer data formats.

If the device or the firmware present thereon is designed so that they can also use new types of data fields or new data types based on at least one transmitted data directory, it will also be possible fully to utilize data formats with new data fields. This data directory can in principle be designed and handled analogously to the reference directory and can define new data fields or data types. The definition of data fields and data types can optionally also be effected simultaneously in a common directory. New data fields can be introduced as extended descriptions of old data fields. For example, an extension of a range or an adaptation of the information resolution can thus be achieved.

The sequence of the data fields which may now be known and capable of being evaluated or may be new and not capable of being evaluated follows from the transmitted reference directory. While the data fields which can be evaluated can already be localized and hence evaluated on the basis of this sequence information, the definition for the data fields which cannot be evaluated can be taken from the data directory so that the data fields which could not be evaluated so far can also be used. In principle, it is possible to combine both types of directories in one directory as well as to permit the introduction of further planes of the data description and definition and to store them in further directories optionally to be transmitted. According to the invention, the reference or data directory can be transmitted both as a file within a process or in segments distributed over a period or a plurality of processes. The utilization then takes place on the basis of the fractions transmitted in the segments or only after complete reception of the total directory. In particular, periodic transmission of short parts of the reference and/or data directory can also be effected in the case of unidirectional communication, it also being possible for this process to be repeated continuously, optionally with interruptions, after complete transmission of a directory. The transmission of the directory consequently acquires a quasicontinuous character. In this way, it will be possible for a receiving device to acquire all parts of the respective directory from the transmitted communications after a certain period and to assemble them into the complete directory again.

BRIEF DESCRIPTION OF THE DRAWINGS

The method according to the invention and associated devices or directories are described in more detail below, purely by way of example, with reference to embodiments shown schematically in the drawing. Specifically.

FIG. 11 shows a schematic diagram of a data directory according to the invention, for the definition of data types;

FIG. 12 shows a schematic diagram of a data directory according to the invention, for the definition of data fields;

FIG. 13 shows a schematic diagram of the relationships of data types, data fields and data formats;

DETAILED DESCRIPTION OF EMBODIMENTS

Figure 1:
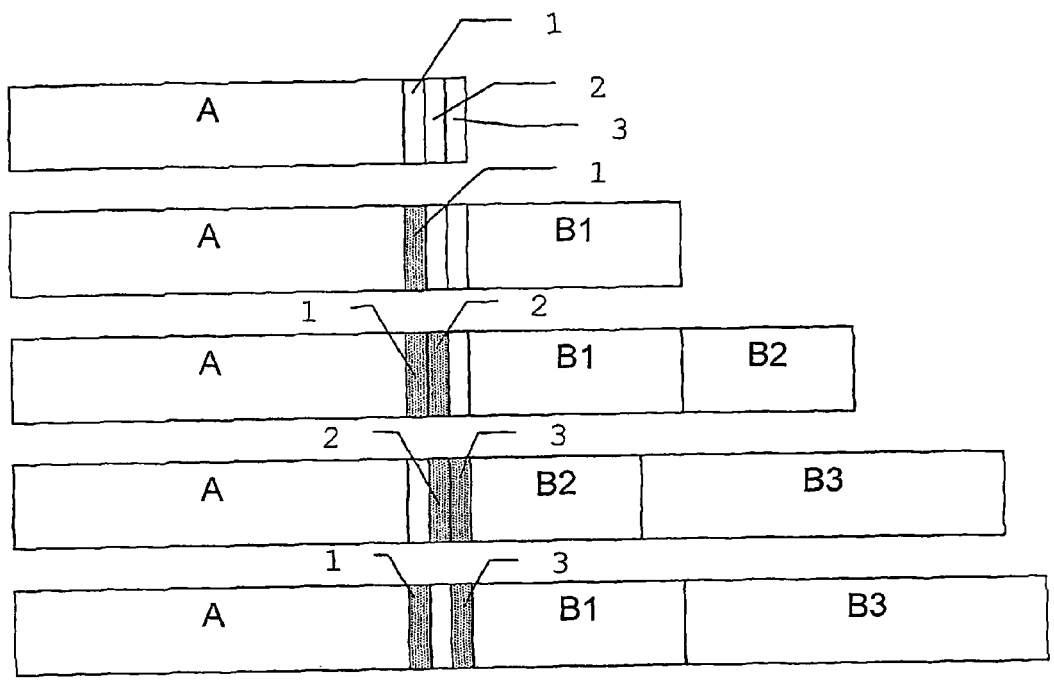
FIG. 1 shows a form for realizing data formats with flags according to the prior art.

FIG. 1 schematically shows the structure of a geodetic data format of the prior art with flags. An example of such a form of realization is the RTCM standard V2.3. An initial part A identical for all data formats is followed by a first flag bit 1, a second flag bit 2 and a third flag bit 3. By setting one of the flag bits, i.e. by assigning the binary value "one" to the respective bit, a corresponding attached additional part is indicated for the evaluating program. In the uppermost example of the code format, all three flag bits 1, 2 and 3 are set to "zero", so that a program processes the initial part of a communication in this format and then reads no further data from this communication. The data format underneath has a first flag bit 1 set to "one", which indicates that an additional part B1 follows. If the first flag bit 1 and the second flag bit 2 are set to "one", as shown in the middle example, two additional parts B1 and B2 follow, the part B1 always following before B2. The sequence of the additional parts is also preserved on omission of one additional part, as shown in the two lowermost examples. By using flag bits, a number of different data formats can thus be derived from in each case a common initial part and a quantity of additional parts corresponding to the number of flag bits, it also being possible in principle for the additional parts to comprise a plurality of data fields in a defined sequence.

Figure 2:
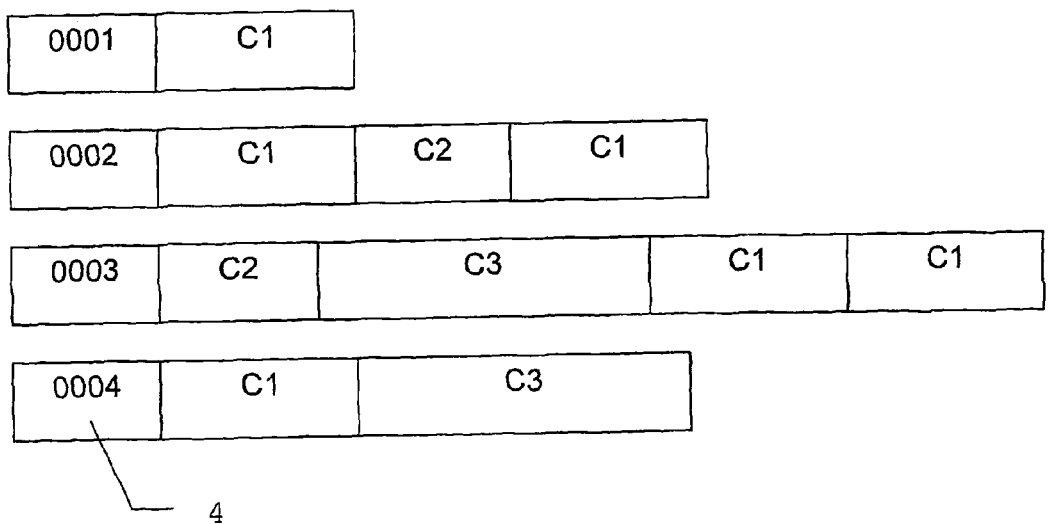
FIG. 2 shows a further form for realizing data formats with a numerical code according to the prior art.

FIG. 2 shows a further embodiment of data formats of the prior art. This example resembles the structure provided in the draft of the standard RTCM 3.0. Each data format now has a coding 4 which is placed at the beginning and represents an initial part of the data format. This coding 4 is followed by a plurality of data fields C1, C2 and C3, the number and sequence of which may vary for each data format; in particular, some data fields may also be repeated, for example if the same data records of different satellites are transmitted in differential GNSS by a reference station.

Figure 3:
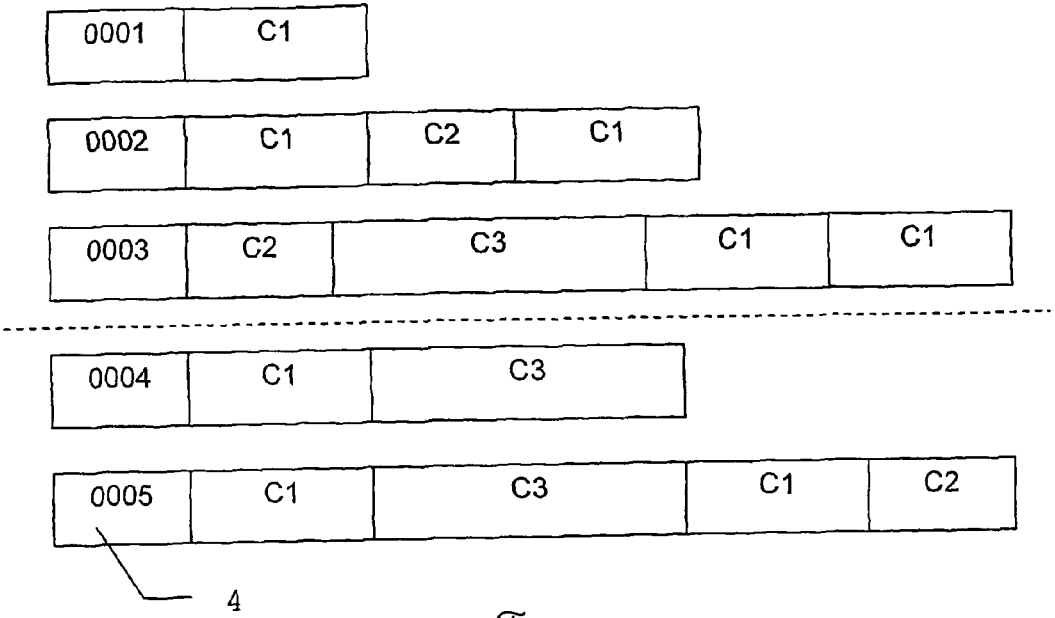
FIG. 3 shows two groups of data formats, one of which consists of data formats which can be directly processed and the other data formats which cannot be directly processed.

FIG. 3 shows two groups of data formats which are identified on the basis of their coding 4. Of these data formats, the versions 0001, 0002 and 0003 are known and can therefore be directly processed, while the data formats 0004 and 0005 have been newly introduced and therefore cannot be processed directly by older devices which do not take these data formats into account in their software. However, in this special case the data formats 0004 and 0005 which cannot be directly processed consist of data fields which can in principle be evaluated by the device and the existing software. However, the respective sequence of the data fields is not known so that no identification and evaluation can take place.

Figure 4:
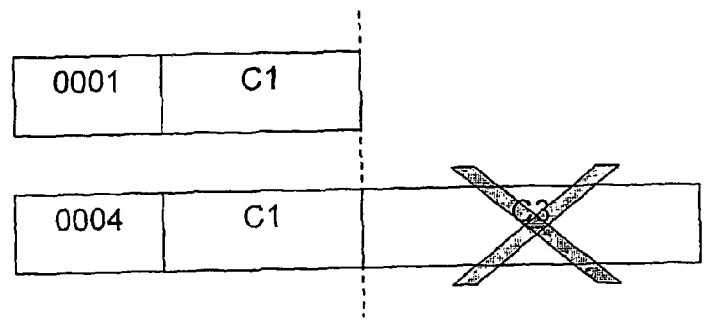
FIG. 4 shows a first possibility for utilizing data fields which can be evaluated in data formats which cannot be directly processed.

FIG. 4 shows a first possibility for utilizing data fields which can be evaluated in data formats from FIG. 3 which cannot be directly processed. If the device has a knowledge of the sequences of data fields, the data format 0004 which cannot be directly processed can be processed as the known data format 0001 by omission or elimination of the data following the data field C1.

Figure 5:
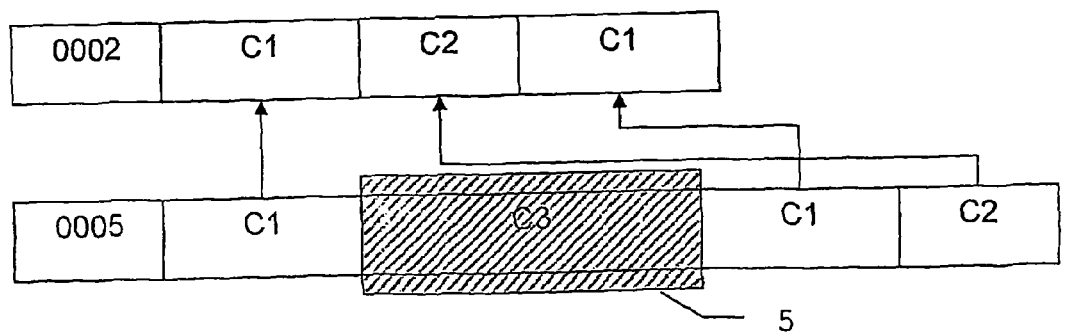
FIG. 5 shows a second possibility for utilizing data fields which can be evaluated in data formats which cannot be processed.

FIG. 5 explains a second possibility for utilizing data fields which can be evaluated in data formats which cannot be directly processed. The data format 0005 which cannot be directly processed can, after omission of the data field C3, be regrouped in such a way that it corresponds to the data format 0002 which can be directly processed. If the sequence of the data fields in the data format 0005 which cannot be directly processed is now known, the data fields which can be evaluated can be temporarily stored in storage means, for example when the data format is received, and then read out from the storage means in the sequence of the data format 0002 which can be directly processed. The data format 0002 which can be directly processed then appears to the processing software.

Figures 6, 7:
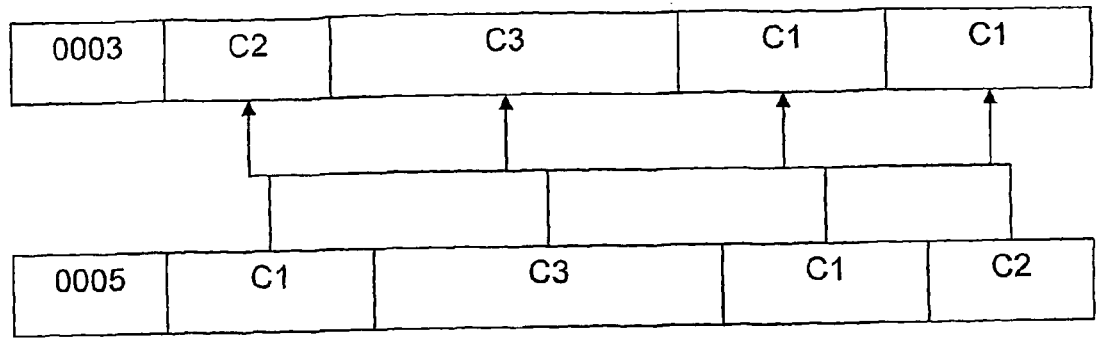
FIG. 6 shows a third possibility for utilizing data fields which can be evaluated in data formats which cannot be processed.
FIG. 7 shows a schematic diagram of a reference directory according to the invention with direct specification of the sequence of data fields.

FIG. 6 shows a third possibility, similar to the diagram in FIG. 5, for utilizing data fields which can be evaluated in data formats which cannot be directly processed, in which, however, no elimination of data fields is effected but the data format 0005 which cannot be directly processed can be completely utilized after rearrangement into a data format 0003 which can be directly processed. Thus, different data formats 0002 or 0003 which can be directly processed can be derived from the same data format 0005 which cannot be directly processed.

FIG. 7 shows an example of a reference directory according to the invention which directly specifies the sequence of data fields for the data formats introduced by way of example in FIG. 3. The data formats are described row by row. The first field of a row contains the coding of the data format, which in this case is effected by a four-digit number. This is followed by a consecutive statement of the data fields in the sequence within the data format. Alternatively, it is also possible to provide an assignment to internal firmware storage areas with a knowledge of the bit structure of the known data fields. Data fields which are not present or the end of the data format achieved thereby is indicated by specification of the data field "00". The form of presentation of FIG. 7 is chosen for reasons of clarity and thus does not necessarily define the format of a reference directory to be transmitted in reality. During the transmission of such a reference directory, it is advisable, because of the data volume to be transmitted, to carry out a compression of the data volume by reducing rows or columns which are not used. For example, after each complete description of a data format, a corresponding indicator signal (stop sequence) for the end of the row can be sent. Alternatively, however, other suitable methods for compressing or transmitting the reference directory may also be used.

Figures 8, 9, 10:
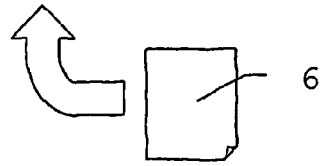
FIG. 8 shows two further groups of data formats, one of which consists of data formats which can be directly processed and the other of data formats which cannot be directly processed.
FIG. 9 shows a schematic diagram of a reference directory according to the invention, with indirect specification of the sequence of data fields.
FIG. 10 shows a schematic diagram of the handling of data fields which cannot be evaluated, with and without use of a data directory.

FIG. 8 shows a first group of data formats 0001-0004 which can be directly processed and a second group of data formats 0005 and 0006 which cannot be directly processed.

FIG. 9 shows, for those groups of data formats which are shown in FIG. 8, a reference directory according to the invention with direct specification of the sequence of data fields. The description of the data formats 0005 and 0006 which cannot be directly processed is based on the changes compared with known data formats which can be directly processed. In the first row, the coding "0005" of the relevant data format is given in the first field. The following two fields of this row state that the sequence of the data fields in this data format corresponds to the successive sequences of the data formats 0004 and 0002 which can be directly processed, but a data field C1 at the end of the sequence thus formed from known data formats has to be removed again. This necessity is indicated by specifying "01" in the last field of the row. Thus, in this example, the constituent known data formats which can be directly processed are stated after the coding in a sequence beginning from the left, while the data fields to be removed are specified at the end of the row, beginning from the right. In the second row, information of the same type is given for the data format 0006. Here, the data format which cannot be directly processed is derived completely from the combination of the two data formats 0002 and 0001 which can be directly processed.

In addition to data fields which can be evaluated, however, new data fields which therefore cannot be evaluated may also occur in data formats which cannot be directly processed. FIG. 10 schematically shows the handling of data fields which cannot be evaluated, with and without the use of a data directory. A further data format 0007 which cannot be directly processed is shown. The upper variant designated by A includes the elimination by the device of the unknown data field which cannot be evaluated. On receiving the communication, the sequence of data fields is taken from the reference directory and the fourth data field C4 is eliminated during the reception or during the subsequent evaluation or is not read out from the storage medium, so that the sequence of data fields no longer contains the data field C4 which cannot be evaluated. Such a sequence then corresponds to the data format 0002 which can be directly processed. The lower variant designated by B shows the use of a data field C4 which cannot be evaluated by use of a data directory 6. The information which enables the device nevertheless to utilize the data contained in the data field which cannot be evaluated is stored in this data directory 6.

FIG. 11 shows a schematic diagram of such a data directory according to the invention, for the definition of data types. The data directory contains, row by row, a definition of data types. For example, a data type "BIT" is defined in the first row here. The designation is stated in the first field. The second field contains the number of bits, the third field the smallest possible value of the data type and the fourth field the largest possible value of the data type. In this case, "BIT" represents a purely binary data type having a length of one bit and the possible distinct values "0" and "1". Such a data type can be used, for example, as a flag. In the next row, for example, the data type "UINT16" is specified. This is a data type having a length of 16 bits, which comprises a value range from "0" to "65535". The data types "INT16" and "INT17", which also include negative value ranges, are defined in the third and fourth rows. Fields in the data directory which are not used are occupied by the value "00", analogously to FIG. 7 and FIG. 9.

A schematic diagram of a further data directory according to the invention, for the definition of data fields, is shown in FIG. 12. A data field is defined in each row, the data types specified in FIG. 11 being employed in this example. In the first row, the data field "01" is defined. This is of the data type "BIT". The following field defines the interpretation of the subsequent fields. Here, a "0" is present as a flag, and fields with all possible distinct values of the value range of this data type now follow. A "1" as a flag indicates that the smallest and the largest permissible value of the data type are stated in the following two fields. In this first row, all possible distinct values which comprise only a "0" and "1" on the basis of the data type now follow. In the fields, these values are assigned in each case to the variables "CODE". For this example, this means that the variable "CODE" present in the device can read out the possible values "0" and "1" from a data format, which by way of example here represent the two different code forms "C/A Code" or "P(Y) Code" of a GNSS satellite. As a further example of a similar data field having an indicator effect, the GNSS system used may also be mentioned. By means of one data type having three permissible distinct values, it would be possible to designate the GPS system by the "0", the GLONASS system by the "1" and the GALILEO system by the "2". In the second row, the data field "02" is defined. This is of the data type "UINT10" and, because of the "1" in the third field, it is evident that the smallest permissible value of the data field is stated in the fourth field and the largest permissible value of the data field is stated in the fifth field. In this example, these values are assigned to the variable "ANT", which corresponds to the technical parameter of the antenna height.

Such a data directory can now be used, for example, to make it possible for older devices which know only two GNSS systems and a coarse subdivision of the antenna height also to be used for data with more than two systems and a finer subdivision of the antenna height. In the case of the number of systems, the new data type and the new data field are communicated to the old device by the data directory. If a generally accepted designation of variables for the systems which can be used, such as, for example, "GNSS", exists, the old device can derive from the data directory that the GNSS systems which it can process are indicated in each case by the first two permissible distinct values of the value range of the data type or data field.

In the case of the antenna height, it is possible for the situation to occur whereby the resolution used is increased and, instead of only 1024 values being sent as the subdivision of the antenna height, 4096 values are sent. From the data in the data directory, lower and upper limits of the value range can now be obtained so that an assignment of the new, finer values to the coarser, old subdivision is possible. In this example, it is to be assumed that the old value range extends from "0" to "0123" and comprises a subdivision into 1024 values. The new data field has a value range from "0" to "2047", and uses a data type with 12 bit and hence a subdivision of 4095 values. The old program can therefore continue operating if it cuts off the upper half of the value range in the evaluation, since these values are beyond the original range. For the lower half, it is now necessary to take into account that in each case two values of the new scale correspond to one value of the old scale. Accordingly, the device must in each case therefore interpret two associated values as one old value. For example, the values "0" and "1" in the new data field will be interpreted as "0" by the device in both cases. The value "2843" transmitted in the new data field could not be processed and would, for example, lead to an error message or to the use of the largest possible value "1023" permissible in the device as a substitute. A corresponding consideration of such a functionality in the development of the old software is a precondition for such applicability of a data directory according to the invention.

In principle, it is also possible to define the data types and data fields in a manner analogous to the data formats by specifying the change of known data fields and data types which can be evaluated.

FIG. 13 shows a schematic diagram of the relationships of data types, data fields and data formats. The data types are specified in the data directory 7', while the data fields are defined by the data directory 7. A data field 05 occurring in the data format 0008 can be found in the data directory 7, where it is specified as data type UINT10. The specification of this data type can be found in the data directory 7'.

Furthermore, data fields and their content can also be provided with abstract identifiers, for example a code sequence followed by consecutive numbering. New data fields having a newly assigned sequence can be stored in a data directory as in FIG. 14. In this data directory, the new data fields 67 and 68 which cannot be evaluated are specified on the basis of the data fields 28 and 29 which can be evaluated. The data field 67 which cannot be evaluated and which is based on the data field 28 which can be evaluated but for which a new value range with the values between 0 and 2400.000 and a resolution of 0.002 are specified is newly introduced in the first row. The definition of the data content and the subsequent data processing are adopted from the definition of the data field 28. The next row defines a possible change of the value range and of the resolution for the data field 29 by stating the new data field 68 which cannot be evaluated and the associated value range and the resolution.

Figures 14, 15:
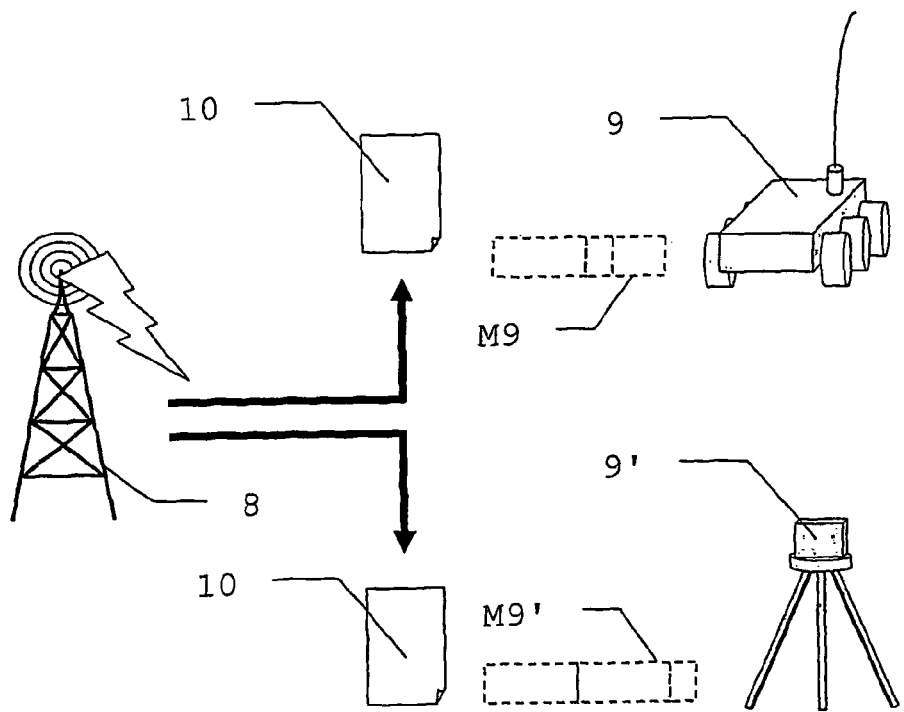
FIG. 14 shows a schematic diagram of a data directory according to the invention, for the definition of data fields which cannot be evaluated, data fields which can be evaluated being utilized.
FIG. 15 shows a schematic diagram of the transmission of the reference directory by a method according to the invention.

FIG. 15 contains a schematic diagram of an example of the transmission of a reference directory 10 by a method according to the invention. While establishing communication, a DGNSS reference station 8 as a first device transmits the reference directory 10 to a rover 9 and a theodolite 9' as two devices present within the transmission range.

Alternatively or in addition, however, periodic transmission of a current reference or data directory can also be effected in the broadcast mode, so that all stations present within the receiving range can receive the directory. The method described below represents only an exemplary possibility of transmission according to the invention in the bidirectional mode. Use for a unidirectional method is also possible according to the invention.

Figure 16:
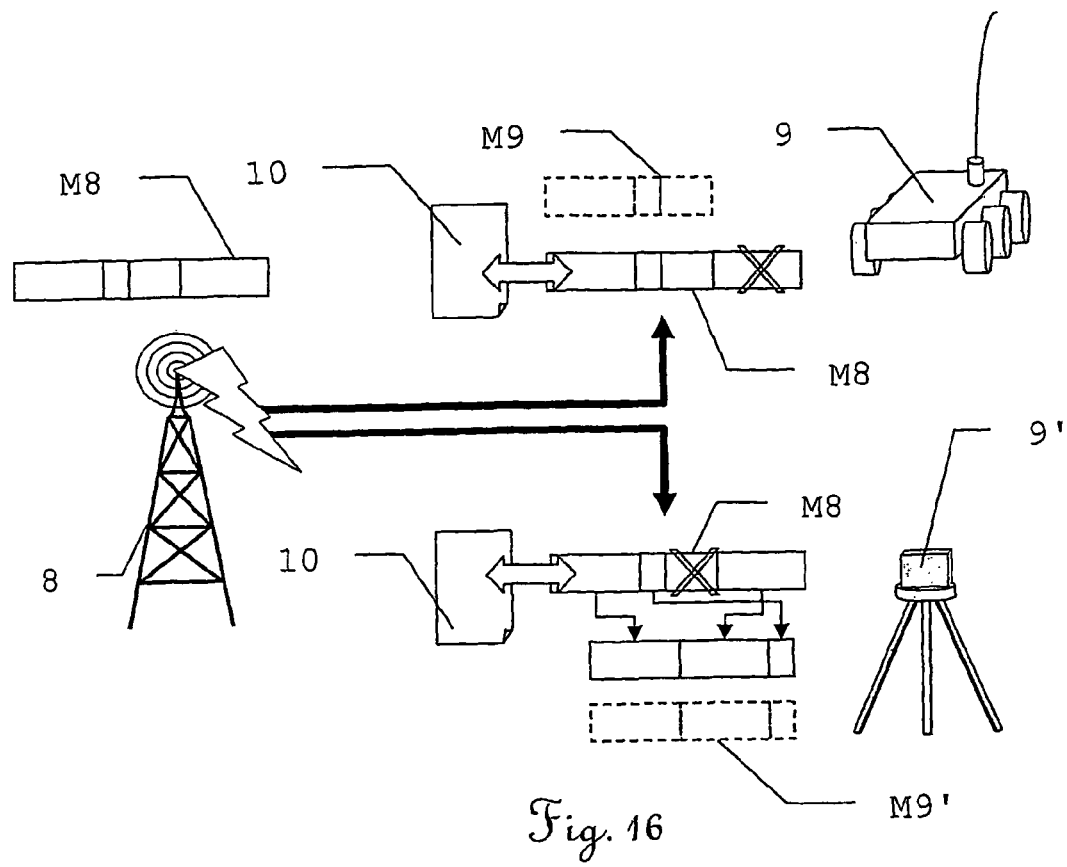
FIG. 16 shows a schematic diagram of the reception and of the evaluation of data, transmitted in data formats which cannot be directly processed, by a method according to the invention.

The software of the rover 9 is designed so that it can directly process only a data format M9, while this applies exclusively to the data format M9' in the case of the theodolite 9'. In the next step, which is shown schematically in FIG. 16, data is transmitted in the format M8 from the DGNSS reference station 8 to the second devices 9 and 9'. These receive the data format M8 which cannot be directly processed, and can identify or localize data fields which can be evaluated with the aid of the reference directory 10. The data formats M9 and M9' which can be directly processed can be derived thereby, and hence the transmitted data can be used—at least in part.

Figure 17:
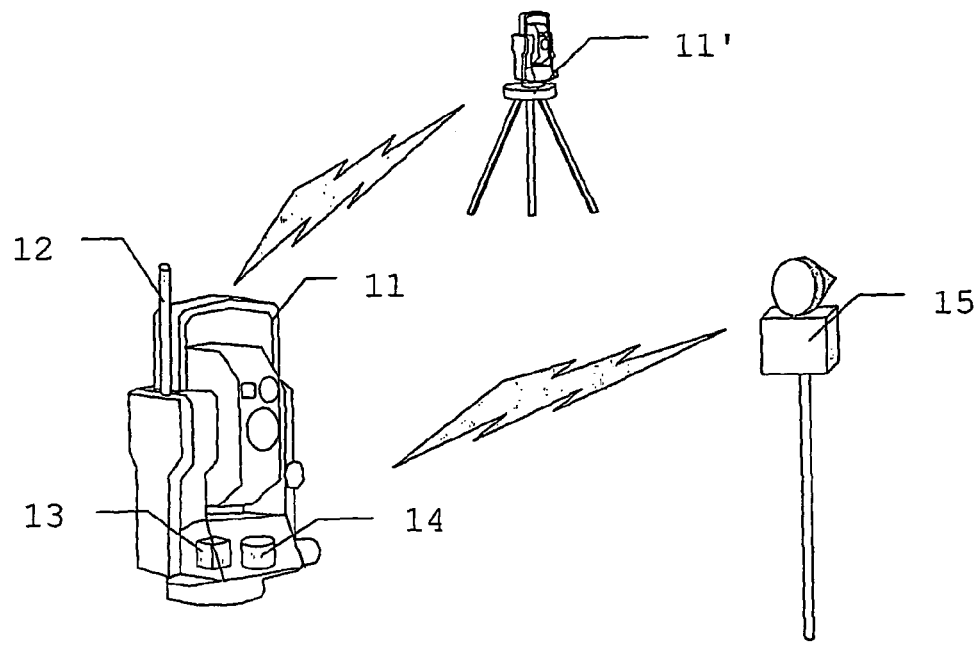
FIG. 17 shows a schematic diagram of a theodolite with further devices as a system according to the invention.

FIG. 17 shows the schematic diagram of a first theodolite 11 with further devices as an example of a system according to the invention. The first theodolite 11 and at least one intelligent reflector 15 as second devices, together with a further theodolite 11' as a first device, are part of a system according to the invention in which communication takes place between all components. For this purpose, the first theodolite 11 has communication means 12 which, in combination with a computer as means for processing the utilizable data 13 and storage means 14, are integrated in the first theodolite 11. At the beginning of communication connection, the further theodolite 11' transmits a reference directory to all second devices. This reference directory is received by the communication means 12 in the first theodolite 11 and stored in the storage means 14. In data formats subsequently transmitted between the devices, data formats which can be evaluated can then be localized on the basis of the reference directory, optionally with the aid of data directories which can likewise be transmitted, and the data contained can be utilized. For this purpose, the data are received by the communication means 12 in the theodolite 11 and evaluated by the means for processing the utilizable data 13. For this purpose, the means for processing the utilizable data 13 employ the reference directory stored in the storage means 14. In this context, no distinction should be made with regard to the realization of evaluation and data processing means. The method according to the invention relates to all computer-aided realizations, regardless of the specific embodiment of the program sequence in circuit form, firmware or recordable software.

The embodiments described represent only examples of realizations according to the invention and are therefore not to be understood as being definitive and limiting. In addition, the person skilled in the art can derive further embodiments according to the invention, for example using alternative forms of data management and data processing. In particular, alternative developments of directories can be used, it being possible in particular to realize combinations of data and reference directories in one or more aggregated directories.

The invention claimed is:

1. Method for using utilizable data, in data formats which cannot be directly processed, in communication, in particular wireless communication, between at least two geodetic devices comprising
   a first device having communication means,
   a second device having
     communication means,
     means for processing utilizable data and
     storage means,
   comprising the steps
     transmission of data by the first device, the data being transmitted in data formats having a sequence of at least two data fields,
     reception of the data and processing of utilizable data by the second device, the utilizable data being read from data fields which can be evaluated,
     characterized in that particularly in relation to the transmission of the data, at least one reference directory is transmitted and is stored in the storage means, the reference directory indicating, in data formats which cannot be directly processed, the data fields which can be evaluated, and wherein the means for processing utilizable data employ the reference directory stored in the storage means for evaluating data received by the communication means,
     characterized in that the utilizable data is transmitted in its original format, and
     characterized in that the reference directory is transmitted separately from the utilizable data.

2. Method according to claim 1, characterized in that a data directory in which data fields and/or data types are defined is transmitted.

3. Method according to claim 1, characterized in that the data formats are uniquely defined by a coding, in particular a numeric or alphanumeric coding.

4. Method according to claim 1, characterized in that, in one of the data formats, at least one data field with a fixed length is chosen, in particular with a length required by the format of geodetic location or time data.

5. Method according to claim 1, characterized in that, when receiving the data or processing utilizable data, at least one data field which cannot be evaluated is suppressed in the data format which cannot be directly processed, so that only one sequence of data fields which can be evaluated is received and/or evaluated.

6. Method according to claim 1, characterized in that, when receiving the data or processing utilizable data in data formats which cannot be directly processed, at least one data field which can be evaluated is localized within the sequence of data fields.

7. Method according to claim 1, characterized in that the indication of data fields which can be evaluated in the reference directory is effected by at least one of the two measures
   specification of the sequence of data fields in data formats which cannot be directly processed, so that data fields which can be evaluated are localized,
   specification of a change of known data formats, so that the sequence of data fields in the data formats which cannot be directly processed can be derived and data fields which can be evaluated can be localized.

8. Method according to claim 1, characterized in that, on transmission of the data, the first device transmits data to a plurality of second devices.

9. Method according to claim 1, characterized in that the transmission of the reference directory is initiated by at least one of the following measures
   establishment of a communication connection between first and second device,
   detection of a set time mark, in particular periodic time mark, during the existence of a communication connection between first device and second device,
   elapse of a counting procedure,
   execution of a defined procedure in the first device,
   transmission of a message by the second device indicating that a data format which cannot be directly processed is being received or was received,
   transmission of a message by the second device, in which message the data formats which can be directly processed by this second device are defined.

10. Geodetic device, in particular reference station for differential GNSS or theodolite, as a first device for carrying out the method according to claim 1, comprising communication means, characterized in that the communication means are designed for transmitting a reference directory or data directory.

11. Geodetic device according to claim 10, characterized in that the communication means are formed so that the transmission of the reference directory or of the data directory is initiated by at least one of the following events
   establishment of a communication connection to a second device,
   detection of a set time mark, in particular of a periodic time mark,
   end of a counting procedure,
   execution of a defined procedure,
   reception of a warning message of a second device stating that a data format which cannot be directly processed is being received or was received,
   reception of a message of a second device, in which message the data formats which can be directly processed by this second device are defined.

12. Geodetic device, in particular rover for differential GNSS, as a second device for carrying out the method according to claim 1, comprising
   communication means,
   means for processing utilizable data and
   storage means,
   characterized in that the communication means and the storage means are formed and arranged in such a way that a reference directory or a data directory is received and stored.

13. Geodetic device according to claim 12, characterized in that the communication means or the means for processing utilizable data are designed so that data fields which can be evaluated and are contained in data formats which cannot be directly processed are identified by indication in the reference directory.

14. Geodetic device according to claim 12, characterized in that the communication means or the means for processing utilizable data are designed so that data fields which cannot be evaluated in the data format which cannot be directly processed are suppressed during the reception of the data or the processing of utilizable data.

15. Geodetic device according to claim 12, characterized in that the communication means or the means for processing utilizable data are designed so that data fields which can be evaluated in the data format which cannot be directly processed are localized during the reception of the data or processing of utilizable data within the sequence of data fields.

16. A geodetic system, comprising:
- at least one of a first geodetic device, in particular reference station for differential GNSS or theodolite, the first geodetic device including a first communication means, wherein the first communication means is designed for separately transmitting (1) a reference directory indicating, in data formats which cannot be directly processed, data fields which can be evaluated and (2) the utilizable data in its original format; and
- at least one of a second geodetic device, in particular a rover for differential GNSS, the second geodetic device including a second communication means, means for processing utilizable data and storage means, wherein the second communication means and the storage means are arranged so that the transmitted reference directory is received and stored,
- wherein the means for processing utilizable data employ the reference directory stored in the storage means for evaluating data received by the second communication means.

* * * * *